Sept. 18, 1951 J. H. SCAFF ET AL 2,567,970

SEMICONDUCTOR COMPRISING SILICON AND METHOD OF MAKING IT

Filed Dec. 24, 1947

INVENTORS: J. H. SCAFF
H. C. THEUERER

BY [signature]

ATTORNEY

Patented Sept. 18, 1951 2,567,970

UNITED STATES PATENT OFFICE 2,567,970

SEMICONDUCTOR COMPRISING SILICON AND METHOD OF MAKING IT

Jack H. Scaff, Summit, N. J., and Henry C. Theuerer, New York, N. Y., assignors to Bell Telephone Laboratories, Incorporated, New York, N. Y., a corporation of New York Application December 24, 1947, Serial No. 793,744

22 Claims. (Cl. 175—366)

This invention relates to electric circuit elements including semiconductive materials and to methods of making such materials.

The materials of particular interest are those semiconductors the electrical characteristics of which are markedly affected by the inclusion therein of very small amounts of significant impurities. The expression "significant impurities" is here used to denote those impurities which affect the electrical characteristics of the material such as the resistivity, photosensitivity, rectification and the like, as distinguished from other impurities which have no apparent affect on these characteristics. The term "impurities" is intended to include intentionally added constituents as well as any which may be in the basic material. Silicon is a material, which along with some representative impurities, will furnish illustrative examples for discussion and explanation of this invention.

Silicon materials of various degrees of purity have been used in the making of elements for point contact rectifiers and like devices and also photovoltaic devices. Silicon of over 99 per cent purity has been melted and cast into ingots under controlled conditions insuring progressive freezing from one end of the ingot to the other. In such ingots there is a first frozen region of p-type silicon, a later frozen region of n-type silicon, and an intermediate high resistance barrier, which develops a photoelectromotive force upon illumination. A p-type rectifying material is one which when used with a suitable contact, passes current more easily when the material is positive and the contact is negative. An n-type rectifying material passes current more easily when the material is negative and the contact is positive. P-type materials also develop positive thermal electromotive forces against metals and have Hall coefficients of positive sign while the converse is true of n-type materials.

One object of this invention is to produce materials having new and advantageous characteristics, suitable for use in electrical circuit elements.

Another object of this invention is to facilitate the production of materials, such as silicon containing one or more impurities, having prescribed electrical characteristics.

A further object of this invention is to simplify the production of alloys of a semiconductive material and an impurity, having uniform electrical characteristics.

A feature of this invention resides in controlling the relative amount of acceptor and donor impurities in the silicon or like material to produce p-type or n-type rectifying material or both, or photovoltaic material, and to determine the resistivity characteristics of each type of rectifier material.

The impurities which produce silicon of n-type are called donors inasmuch as these impurities contribute to the electrical conductivity by donating electrons to an unfilled energy band in the silicon. On the other hand, impurities which produce p-type silicon are known as acceptors for these impurities contribute to the electrical conductivity by accepting electrons from a filled energy band, permitting what is known as conductivity by holes in which the sign of the carriers appears to be positive.

It has been found that boron and aluminum are acceptor impurities in silicon, and that phosphorus, antimony and arsenic are donor impurities. For purposes of discussion, this invention will be set forth in terms of the relative effect of two of these impurities namely, boron and phosphorus.

The above noted and other objects and features of this invention will be more fully and clearly understood from the following detailed description of illustrative embodiments thereof in connection with the appended drawings in which.

Silicon materials suitable for contact rectification elements and other electric circuit elements are made by melting the materials and casting them in a mold to form an ingot from which the circuit elements are made. It has been found advantageous with these materials to control the cooling of the melt so that freezing progresses from the free surface inwardly. For normal orientation of molds this is a progressive freezing from top to bottom. In view of such procedure, this invention is discussed and disclosed on the basis of top to bottom freezing.

Figure 1:
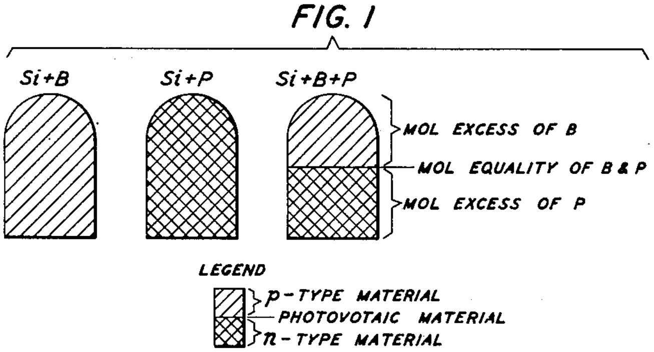
Fig. 1 is a conventionalized showing of ingot sections illustrating features of this invention.

As illustrated in Fig. 1 if a very small amount (a few thousandths of 1 per cent) of an acceptor impurity such as boron is added to pure silicon the resulting ingot is entirely of p-type material. Furthermore, if a comparable amount of a donor impurity such as phosphorus is added to pure silicon the ingot contains only n-type material. If, however, proper relative amounts of both acceptor and donor impurities, e. g. boron and phosphorus, are added to pure silicon, the top part of the ingot (first frozen) contains a molar excess of boron and is of p-type and the lower part contains a molar excess of phosphorus and is of n-type. At that region of the ingot where boron and phosphorus appear to be present in equal molar quantities, the material is of high resistance and exhibits a photovoltaic effect when exposed to suitable radiation.

Segregation of the impurities in each case is normal, there being the least impurity in the early frozen top part with an increase in impurity as the bottom is approached. This is illustrated for boron and phosphorus respectively in curves A and B of Fig. 2. Furthermore the resistivity of each of the single impurity alloys decreases from top to bottom of the ingot, that is with increase in impurity.

When both boron and phosphorus are added to the silicon, distribution of each throughout the ingot is normal, i. e. increase in impurity with depth in the ingot. However, when both boron and phosphorus are present in the melt the resistivity distribution in the ingot does not follow the previously noted pattern for single impurities. If, for example, the relative amounts of boron and phosphorus are such that both p and n-type material are formed, the first frozen p-type material is of relatively low resistivity and the resistivity increases with depth to a high value at the barrier between p-type and n-type material. With further increase in depth the resistivity decreases to a low value at the bottom of the ingot. This seemingly anomalous resistivity distribution is, as discovered by applicants, due to the fact that boron and phosphorus have a neutralizing effect on each other as to resistivity and cause the formation of the high resistivity, photosensitive barrier between the two types of rectifying material when present in electrically equivalent amounts. The electrical equivalency appears to correspond to the presence of equal molar amounts of the two impurities.

Figures 2, 5:
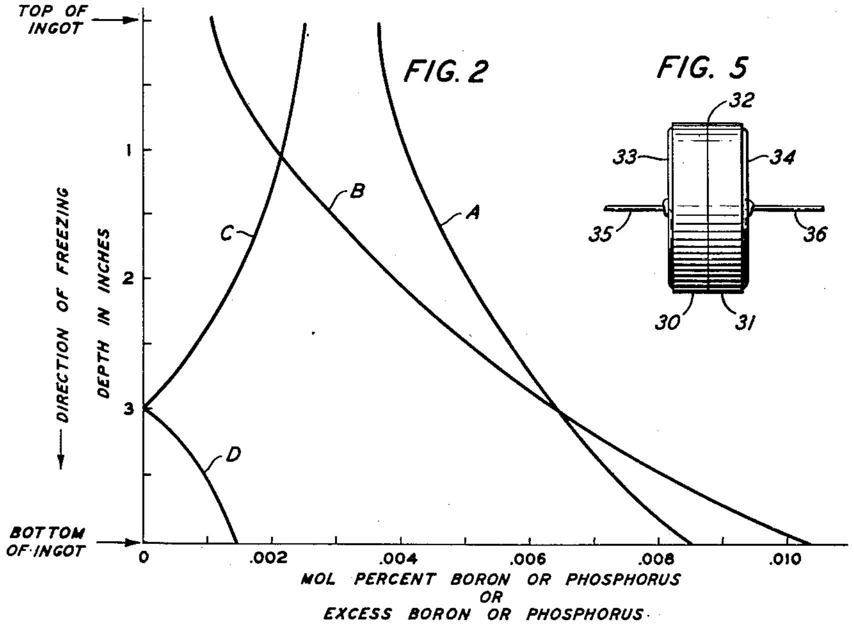
Fig. 2 illustrates graphically the distribution of alloying elements in a silicon ingot.
Fig. 5 is a view in elevation of an edge illuminated photocell in accordance with this invention.

Since, as illustrated in curves A and B of Fig. 2, phosphorus appears to segregate at a higher rate than boron, the addition of suitable amounts of each to the silicon results in excess molar amounts of boron in the upper part of the ingot and excess molar amounts of phosphorous in the lower part. This is illustrated in curves C and D which indicate respectively molar excesses of boron and of phosphorus. Thus, since it is the molar excess of either impurity that controls the resistivity, the apparently anomalous resistivity distribution is explained.

Looking again at Fig. 2, it will be seen that if the amount of boron is increased keeping the phosphorus the same, curve A will be moved to the right, the difference curve C also will move to the right, and the intersection of A and B downward. The ingot will contain more p-type material of lower average resistivity due to a greater excess of the boron. Also, if the phosphorus is decreased keeping the boron constant, the curve B will shift to the left, the difference curve C to the right and the intersection of A and B downward. As in the other case the excess boron gives more p-type material of lower average resistivity.

The curves of Fig. 2 are based on observations made on a plurality of ingots made with different total and relative amounts of impurities. For example since on a molar basis .00035 per cent boron is equivalent to .001 per cent phosphorus, a 45 gram ingot, which was made with silicon containing .001 per cent phosphorus and .0005 per cent boron, had a boron excess of .00015 per cent. Examination of this ingot revealed that the upper two-thirds (about 30 grams) was p-type material and the lower one-third (about 15 grams) was n-type material. The boundary region between the different materials was found to exhibit photovoltaic properties.

Other ingots have been made from silicon containing on the average .0085 per cent phosphorus (from .007 to .01 per cent) with different amounts of boron. For example with approximately .005 per cent boron slightly over half of the ingot was p-type; with approximately .006 per cent boron about three-fourths was p-type; with approximately .008 per cent boron nearly nine-tenths was p-type and with approximately .015 per cent boron the whole ingot was p-type. Another ingot containing .00085 per cent phosphorus and .0015 per cent boron was of substantially all p-type material.

Bearing in mind that .001 per cent phosphorus is equivalent to .00035 per cent boron on a molar basis, the boron equivalent for the .0085 per cent phosphorus and .00085 per cent phosphorus of two of these ingots is about .003 and .0003 per cent respectively. Thus the molar ratio of boron to phosphorus in the ingots containing .015 per cent boron and .0085 per cent phosphorus or .0015 per cent boron and .00085 per cent phosphorus is about 5 to 1. Furthermore the resistivity is substantially uniform throughout each of these two ingots, being about .01 ohm-centimeter for the .0085 per cent phosphorus-.015 per cent boron material and about .06 ohm-centimeter for the .00085 per cent phosphorus-.0015 per cent boron material. In the other examples given above, all containing about .0085 per cent phosphorus, the resistivity gradient from top to bottom of the p-type region ranged from .08 to .34 ohm-centimeter for the .005 per cent boron material to from .03 to .07 ohm-centimeter for the .008 per cent boron material.

The ingots were made by comelting the silicon with the requisite amounts of boron and of phosphorus in a crucible enclosed in an electrically heated furnace chamber. The atmosphere in the chamber was helium. The arrangement was such that the chamber could be gradually withdrawn from the heating means so that the ingot solidified slowly from the top or free surface downward. A uniform rate of withdrawal of about one-eighth inch per minute, which has been found to give ingots of desired physical characteristics was found suitable for obtaining the electrical characteristics sought.

The slow progressive cooling allows ordered segregation of the impurities throughout the ingot so that advantage may be taken of different segregation rates of the impurities as has been discussed with respect to the curves of Fig. 2.

As indicated by the foregoing examples it has been found that the resistivity gradient in the ingot can be controlled by controlling the boron to phosphorus ratio. By maintaining this ratio at an optimum value, the resistivity gradient may be so reduced that there is little variation in the resistivity between the top and the bottom of the p-type zone. It has been found that this optimum ratio of boron to phosphorus is about 5 to 1 on a molar basis. The excess of boron may be such, when this ratio is maintained, that the ingot is entirely of p-type material all of approximately the same resistivity. Thus, by maintaining the optimum ratio and changing the total amount of the two impurities, a plurality of ingots having a range of resistivity values may be made, each ingot comprising material of substantially the same resistivity throughout its p-type zone. The various applications of crystal rectifiers are such that the ability to make ingots with substantially uniform desired resistivity throughout greatly facilitates the production of such devices. Moreover, for other uses, as in resistance elements for example, uniformity of resistivity throughout a massive section is a prime requirement.

Figure 3:
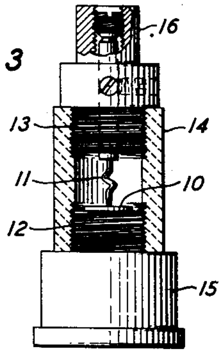
Fig. 3 is a sectional view of a point contact rectifier including a crystal element made in accordance with this invention.

The device shown in Fig. 3 is a point contact rectifier employing a silicon crystal 10 to which the point of the fine wire 11 makes rectifying contact. The parts 10 and 11 are secured to suitable supports 12 and 13 which are in turn supported by the insulating body 14. Electrical connection is made to the device at the base 15 and at the terminal 16. The crystal 10 is of highly pure silicon containing enough donor or acceptor impurity or both in accordance with this invention to obtain the desired electrical characteristics.

Figure 4:
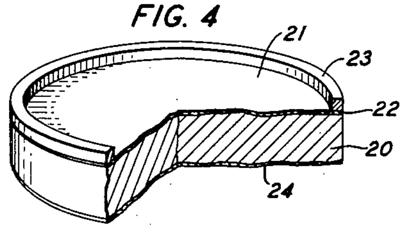
Fig. 4 is a perspective view with parts broken away illustrating a photovoltaic cell of the front wall type in accordance with this invention.

On the basis of the discoveries of this invention photosensitive devices of the face illumination or front wall type as illustrated in Fig. 4 may be made of suitably alloyed silicon material. The main body 20 shown in Fig. 4 may comprise p or n-type material having a thin film 21 of the opposite type material, i. e. n or p respectively, on one face. Between the body 20 and the film 21 is the photovoltaic barrier 22. The thin film 21 transmits sufficient radiant energy to affect the barrier 22. Electrical contact may be made to the device by means of the metallic ring 23 and the metallic film 24 secured to opposite faces of the body 20. The film 24 may be made from a heat-cured silver paste comprising finely divided silver, a small amount of binder and a volatile solvent.

The crystal elements for devices such as shown in Fig. 4 may be made from a piece of p-type silicon, e. g. one containing an acceptor impurity such as boron, by a surface treatment with a donor impurity such as phosphorus. The treatment produces a very thin, light permeable film of n-type silicon at the surface with the photovoltaic barrier between this film and the main body of p-type material. This process could also be applied to a piece of n-type material by adding enough acceptor material to the surface to produce a light permeable film of p-type material and the photovoltaic barrier between this film and the n-type material.

One particular way of making such a photocell element is to seal a body of p-type silicon in an evacuated silica tube with some yellow phosphorus. The tube may then be heated at from 650 to 1000° C. for from one-half to four hours. The body thus treated exhibits a bluish film which has n-type rectification properties. Exposure to light also reveals the photovoltaic properties of the barrier layer.

Another method of producing the photovoltaic barrier starts with a p-type silicon known to contain both acceptor and donor impurities such as boron and phosphorus. A surface is polished and heat treated in water saturated air, or steam at 1000° C. The resulting oxide layer may then be etched off with a hydrofluoric acid solution. Boron is thus removed by selective oxidation from the surface of the material. Several successive heat treatments and etchings may be required to remove sufficient boron to produce an n-type film on the surface with the underlying photovoltaic barrier.

The device illustrated in Fig. 5 is a photocell of the edge illuminated type. The cell may comprise a body or block of semiconductive material including a p-type portion 30 and an n-type portion 31 with a barrier layer 32 between them. The outer faces of the device may each be coated with metallic films or electrodes 33 and 34 respectively. These may be made from any suitable material such as the silver paste used in the device shown in Fig. 4. Wires or other suitable conductors such as 35 and 36 may be secured to the respective metallic films as by soldering. Suitable illumination of the barrier 32 will produce a photovoltaic effect in this cell. The semiconductive body for this type of cell may be made from an ingot containing both p and n-type materials by cutting out a section including the barrier layer and some of each type of material.

Although the results obtained by the addition or retention of the various significant impurities are attributable to the elemental material used, e. g. phosphorus or boron, it is not necessary that these materials be added in the elemental form. Like effects may be obtained by the addition of suitable compounds containing the significant impurities, e. g. a phosphate or borate or any compound that does not include material deleterious to the product being produced and that will yield the element in effective character during processing.

The ability, in accordance with the teachings of this invention, to determine the rectifying and other electrical characteristics of semiconductors by control of small amounts of acceptor and donor impurities in such semiconductors may also be used in the making of other circuit elements such as solid rectifiers and edge-illuminated type photocells.

As has been noted the various effects produced by the addition of boron and phosphorus to silicon are due to very small quantities of these materials. The amount of either impurity may range between less than about .001 per cent to about .01 per cent, the total and relative amounts being determined by the particular effect desired.

Although this invention has been described by means of exemplary embodiments, it will be understood that it is not limited thereby but by the scope of the appended claims only.

What is claimed is:

1. The method of making a body of semiconductive material having a zone of p-type rectifying material, a zone of n-type rectifying material and an intermediate barrier layer of photovoltaic material that comprises melting high purity silicon with very small amounts of both acceptor and donor impurities, and cooling the melt progressively so that the impurities segregate at different rates to form the p-type zone in which the acceptor impurity predominates, the n-type zone in which the donor impurity predominates and the intermediate photovoltaic layer in which the acceptor and donor impurities are present in electrically equivalent amounts.

2. The method of making a body of semiconductive material having a zone of p-type rectifying material, a zone of n-type rectifying material and an intermediate barrier layer of photovoltaic material that comprises melting high purity silicon with very small amounts of both acceptor and donor impurities, selected respectively from the third and the fifth periodic groups according to Mendeleeff and cooling the melt progressively so that the impurities segregate at different rates to form the p-type zone in which the acceptor impurity predominates, the n-type zone in which the donor impurity predominates and the intermediate photovoltaic layer in which the acceptor and donor impurities are present in electrically equivalent amounts.

3. The method of making a body of semiconductive material having a zone of p-type rectifying material, a zone of n-type rectifying material and an intermediate barrier layer of photovoltaic material that comprises melting high purity silicon with very small amounts of both acceptor and donor impurities, selected respectively from a group consisting of boron and aluminum and a group consisting of phosphorus, arsenic and antimony, and cooling the melt progressively so that the impurities segregate at different rates to form the p-type zone in which the acceptor impurity predominates, the n-type zone in which the donor impurity predominates and the intermediate photovoltaic layer in which the acceptor and donor impurities are present in electrically equivalent amounts.

4. The method of making a body of semiconductive material having a zone of p-type rectifying material, a zone of n-type rectifying material and an intermediate barrier layer of photovoltaic material that comprises melting high purity silicon with very small amounts of both boron and phosphorus, and cooling the melt progressively so that the impurities segregate at different rates to form the p-type zone in which the boron predominates, the n-type zone in which the phosphorus predominates and the intermediate photovoltaic layer in which the boron and phosphorus are present in electrically equivalent amounts.

5. The method of making a semiconductive element having front wall type photovoltaic characteristics that comprises chemically treating the surface of a body of either rectifying type of silicon to produce an acceptor-donor impurity balance in the material adjacent the surface of the body whereby a photovoltaic layer is formed.

6. A photovoltaic cell of the front wall type comprising a body of silicon rectifying material having a light permeable surface which has been converted to rectifying material of the opposite type to that of the body, and an underlying photovoltaic layer.

7. A photovoltaic cell of the front wall type comprising a body of n-type silicon rectifying material having a light permeable surface of p-type material which has been converted from said n-type material, and an underlying photovoltaic layer.

8. A photovoltaic cell of the front wall type comprising a body of p-type silicon rectifying material having a light permeable surface of n-type material which has been converted from the p-type material, and an underlying photovoltaic layer.

9. The method of making a semiconductive element having front wall type photovoltaic characteristics that comprises chemically altering a surface layer of a body of p-type rectifying silicon containing both acceptor and donor impurities to change the surface layer to n-type silicon and to produce an acceptor-donor impurity balance in the material adjacent to the surface of the body, whereby a photovoltaic layer is formed.

10. The method of making a front wall type photovoltaic cell element, that comprises treating a surface of a body of p-type rectifying silicon with phosphorus to change the surface to n-type silicon and the immediately underlying layer to high resistance photovoltaic material.

11. The method of making a front wall type photovoltaic cell that comprises treating the surface of a body of p-type silicon containing both boron and phosphorus impurities by selectively oxidizing boron from said surface to produce n-type silicon with a photovoltaic layer thereunder.

12. The step in the method of making an electrical translating material by comelting and casting silicon with very small amounts of boron and phosphorus to produce substantially uniform resistivity throughout the zone of p-type material, that comprises setting the ratio of boron to phosphorus in the melt at about 5 to 1.

13. In a method of making semiconducting material for translating devices that comprises melting together and casting silicon with very small amounts of boron and phosphorus, the step of maintaining substantially uniform resistivity throughout the p-type zone of the cast material that comprises employing a boron to phosphorus ratio of about 5 to 1.

14. The method of controlling the sign of rectification and the resistivity of rectifying material comprising an elemental material plus a very small amount of significant impurities that comprises regulating the relative and total amounts of acceptor and donor impurities in the material.

15. A rectifier comprising a body of an alloy of phosphorous, boron and silicon containing up to .01 per cent phosphorus and up to .01 per cent boron.

16. An n-type rectifying material comprising a silicon alloy including very small amounts of boron and phosphorus, the phosphorus being in molar excess of the boron.

17. A p-type rectifying material comprising a silicon alloy including very small amounts of boron and phosphorus, the boron being in molar excess of the phosphorus.

18. The method of making an ingot of p-type semiconductive material having substantially uniform electrical characteristics throughout that comprises comelting a p-type semiconductive material containing an acceptor impurity with a donor impurity, the ratio of acceptor to donor impurity being such that the effect of the acceptor impurity on the electrical characteristics of the resulting material remains dominant but is partially neutralized by the donor impurity, and controlling the cooling of the melt to maintain the acceptor dominance at substantially the same value throughout the ingot.

19. The method of making a semiconducting material that comprises adding to a basic material small amounts of both donor and acceptor constituents with the acceptor constituent in excess, and melting and then cooling the mixture so that the donor constituent segregates at a faster rate than the acceptor, whereby improved uniformity of electrical characteristics throughout the material is obtained.

20. The method of making a semiconductor material of uniform electrical characteristics that comprises adjusting the relative amount of donor and acceptor impurity in the material so that one is in excess of the other, melting the mixture, and then solidifying it in such a manner that the major impurity segregates at a slower rate than the minor impurity.

21. The method of making a semiconductive element which comprises heating a body of semiconductive material containing an excess of one conductivity type determining impurity in the presence of the opposite conductivity type determining impurity to effect a conversion in the conductivity type of a surface layer of the body.

22. The method of making a semiconductive element which comprises introducing into a surface region of a body of silicon material containing an excess of one conductivity type determining impurity, a quantity of the opposite conductivity type determining impurity to convert the conductivity type of said surface region.

JACK H. SCAFF.
HENRY C. THEUERER.

REFERENCES CITED

The following references are of record in the file of this patent:

UNITED STATES PATENTS

| Number | Name | Date |
|---|---|---|
| 2,402,582 | Scaff | June 25, 1946 |